United States Patent
Trahan et al.

(10) Patent No.: US 11,307,846 B2
(45) Date of Patent: Apr. 19, 2022

(54) SYSTEM AND METHOD FOR IMPLEMENTING A TECHNICAL DEBT AUTOMATION

(71) Applicant: JPMorgan Chase Bank, N.A., New York, NY (US)

(72) Inventors: Matthew Trahan, Katy, TX (US); James Todd Barnes, Katy, TX (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 16/993,915

(22) Filed: Aug. 14, 2020

(65) Prior Publication Data

US 2021/0049003 A1 Feb. 18, 2021

Related U.S. Application Data

(60) Provisional application No. 62/887,772, filed on Aug. 16, 2019.

(51) Int. Cl.
*G06F 8/658* (2018.01)
*G06F 8/71* (2018.01)
*G06F 8/73* (2018.01)
*G06F 8/77* (2018.01)

(52) U.S. Cl.
CPC ........... *G06F 8/658* (2018.02); *G06F 8/71* (2013.01); *G06F 8/73* (2013.01); *G06F 8/77* (2013.01)

(58) Field of Classification Search
CPC ... G06F 8/658; G06F 8/71; G06F 8/73; G06F 8/77; G06F 9/44526
USPC ........................................................ 717/170
See application file for complete search history.

(56) References Cited

U.S. PATENT DOCUMENTS

| | | | |
|---|---|---|---|
| 2008/0033846 A1* | 2/2008 | Rehrauer et al. | G06F 8/71 705/28 |
| 2017/0034023 A1* | 2/2017 | Nickolov et al. | G06F 8/658 |
| 2019/0129712 A1* | 5/2019 | Hawrylo et al. | G06F 8/71 |

* cited by examiner

*Primary Examiner* — Wei Y Zhen
*Assistant Examiner* — Mohammed N Huda
(74) *Attorney, Agent, or Firm* — Hunton Andrews Kurth LLP

(57) ABSTRACT

An embodiment of the present invention is directed to an automated series of modules to reduce recurring tasks, eliminate manual errors, reduce the firm's risk profile, and decrease time for version upgrades. An embodiment of the present invention is directed to a Technical Debt Automation Tool that determines current and subsequently released versions from a primary vendor as well as for other vendors for various plugins that provide critical business functionality. An embodiment of the present invention may calculate an amount of technical debt (e.g., changes) that an entity (e.g., firm) will have to make due to the customization inherent with firmwide risk policies and AD (Application Development) methodology.

12 Claims, 3 Drawing Sheets

SYSTEM AND METHOD FOR IMPLEMENTING A TECHNICAL DEBT AUTOMATION

CROSS REFERENCE TO RELATED APPLICATIONS

The application claims priority to U.S. Provisional Application 62/887,772, filed Aug. 16, 2019, the contents of which are incorporated herein in their entirety.

FIELD OF THE INVENTION

The invention relates generally to a system and method for implementing a technical debt automation tool.

BACKGROUND OF THE INVENTION

Current vendor products managed by Developer Services generally require extended lead times for evaluation, installation, configuration, customization and testing. The effort by a medium team (e.g., 8-10 person) to implement a new version of a tool stands at a minimum of three months due to changes in the product's API, a firm's customizations (and associated technical debt), plugin version capability analysis, Permit to Build/Permit to Operate meetings, documentation, and functional/performance testing. With this extended lead time, an entity's risk profile increases if there is a critical vulnerability found in products. Entities are required to further continue an extended build cycle to ensure functional, performance, and resilient platforms.

These and other drawbacks exist.

SUMMARY OF THE INVENTION

According to one embodiment, the invention relates to a system that implements a technical debt automation tool. The system comprises: a memory configured to store and manage source code; and a computer processor, coupled to the memory, configured to perform the steps of: identifying a product that is installed where the product is associated with a vendor; obtaining a set of dependencies comprising version data and plugin data from the installed product; obtaining, via an external link, reference documentation from a source associated with the vendor; obtaining, via the external link, product and plugin binaries from the source associated with the vendor; uploading binaries for scanning to a security vulnerability platform; determining a technical debt associated with an update from a current version to an upgrade version wherein the technical debt comprises a set of changes and mapping for the update; generating a set of plugin upgrade paths for the update; and communicating, via a communication network, the technical debt and the set of plugin upgrade paths to a recipient.

According to another embodiment, the invention relates to a method that implements a technical debt automation tool. The method comprises the steps of: identifying a product that is installed where the product is associated with a vendor; obtaining a set of dependencies comprising version data and plugin data from the installed product; obtaining, via an external link, reference documentation from a source associated with the vendor; obtaining, via the external link, product and plugin binaries from the source associated with the vendor; uploading binaries for scanning to a security vulnerability platform; determining a technical debt associated with an update from a current version to an upgrade version wherein the technical debt comprises a set of changes and mapping for the update; generating a set of plugin upgrade paths for the update; and communicating, via a communication network, the technical debt and the set of plugin upgrade paths to a recipient.

The system may include a specially programmed computer system comprising one or more computer processors, interactive interfaces, electronic storage devices, and networks. The computer implemented system and method described herein provide unique advantages to entities, organizations, developers and other users, according to various embodiments of the invention. For example, a vendor may notify an entity of a critical vulnerability existing in a currently supported version. With an innovative tool of an embodiment of the present invention, the amount of work to reduce the risk vulnerability may substantially decrease (e.g., from 3 months to 2 weeks) which includes various functional and performance testing. With an embodiment of the present invention, an entity may automatically view change-sets, understand customization changes, generate documentation (including release notes), analyze plugin changes, reduce manual errors, and schedule necessary tollgates with senior management.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
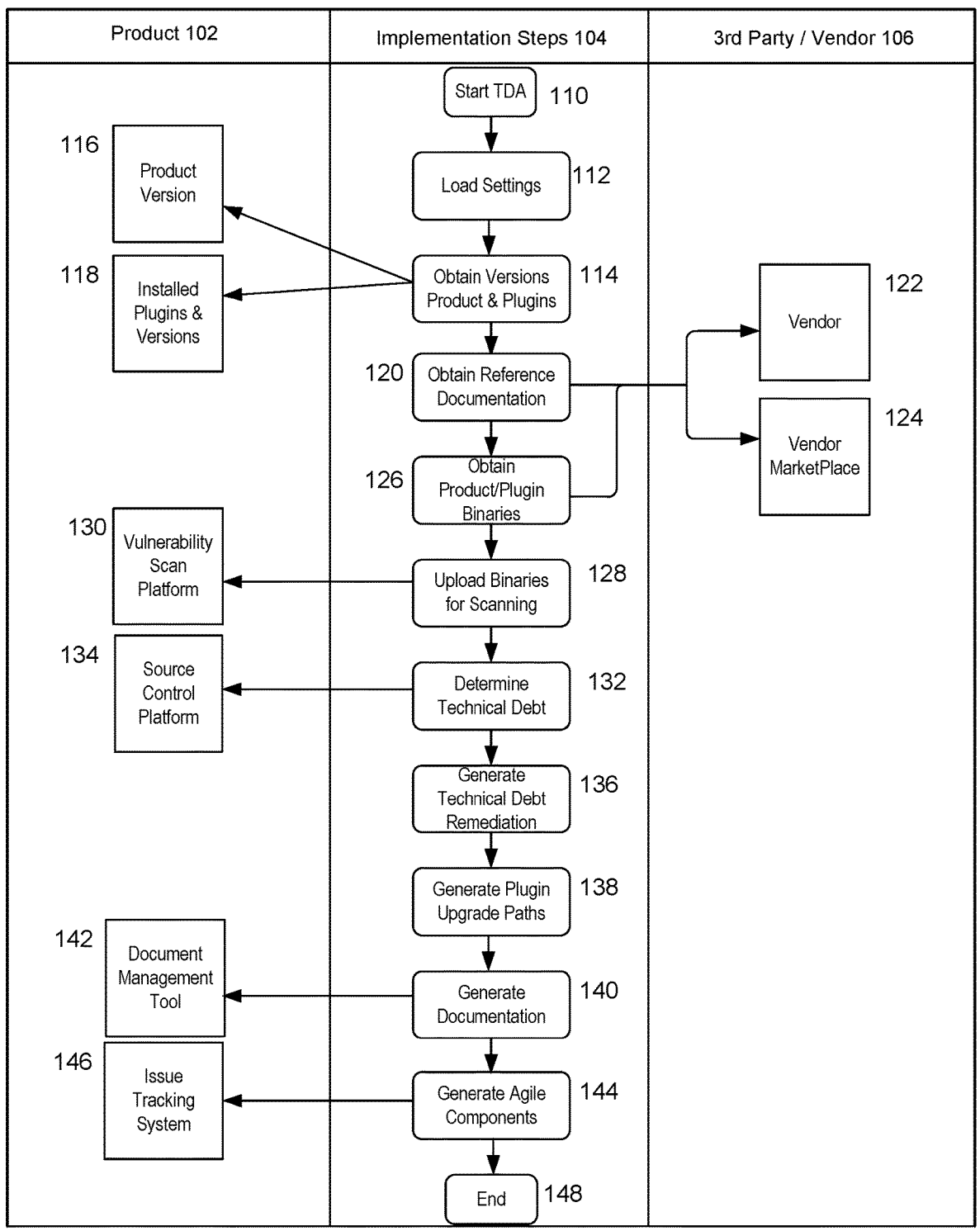
FIG. 1 is an exemplary flowchart for implementing technical debt automation, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to an automated series of components/modules developed to reduce recurring tasks, eliminate manual errors, reduce an entity's risk profile, and decrease time for version upgrades. An embodiment of the present invention is directed to a Technical Debt Automation Tool that analyzes current and subsequently released versions from a primary vendor (e.g., Atlassian). The Technical Debt Automation Tool may be applied to other vendors for various plugins that provide critical business functionality. An embodiment of the present invention may then calculate an amount of technical debt (e.g., changes) that an entity (e.g., firm) will have to make due to the customization inherent with firmwide risk policies and AD (Application Development) methodology.

Additionally, an embodiment of the present invention is directed to providing a risk analysis of supporting plugins due to nature and versioning methodology so as to prepare senior management for the total amount of risk associated with the proposed upgrade. The Technical Debt Automation Tool may also submit binaries (e.g., base product and plugins) to a comprehensive software composition analysis solution (e.g., platform to scan for known security vulnerabilities, such as Blackduck) for scanning and risk analysis. An embodiment of the present invention may be configured for various types of workflows. For example, as part of a Software Development Life Cycle (SDLC) process, downloaded software may be scanned for vulnerabilities before placing it on the firm's infrastructure. Other solutions for managing risks may be applied that provide risk management and binary inspection. Binaries may represent any software that is compiled and may be executed at the OS level.

According to an exemplary embodiment, the Technical Debt Automation Tool may also be based on Agile methodology, as it will create the necessary stories (fully customizable) to record efforts for the release to pass the (Permit to Build) PTB and (Permit to Release) PTX processes. Stories (e.g., JIRA stories) may represent requirements or requests. Permit to Build (PTB) may represent a procedural step in a SDLC workflow where software releases may be required to pass in order to obtain management and technical approval to move forward as an objective, project, or task. For example, the release may be required to work towards an objective that aligns to a group's goals (e.g., yearly goals, etc.) and pass the technical constraints required by the firm (e.g., no critical performance or security vulnerabilities, etc.). Permit to Release (PTR) may represent a procedural step in a SDLC workflow where software releases may be required to pass in order to obtain management and technical approval to be released into a production environment. This may represent a final approval step before a change record (ITSM—IT Service Management) is submitted for approval to changes in production.

In addition, the Technical Debt Automation Tool may schedule review meetings with full documentation for senior management visibility as well as end-user documentation. JIRA is an example of an issue tracking system that provides bug tracking, issue tracking and project management functions. An exemplary embodiment of the present invention may be applied to JIRA projects. However, JIRA projects are one example and the innovations of the present invention may be applied to various issue tracking systems and other similar systems.

An embodiment of the present invention may provide Agile integration. Agile integration may represent an approach that allows microservices to be dropped into an architecture or be removed or updated without disrupting other services. Agile software development may generally refer to software development methodologies focused on iterative development, where requirements and solutions may evolve through collaboration between self-organizing cross-functional teams. For example, the innovative tool may execute with a flag that creates the necessary epic and associated stories (with sub-tasks) into JIRA for technical debt and plugin upgrades. Tasks that must be completed for a production release may be entered into a JIRA platform so they may be assigned to individual software developers, tracked, and closed for completion.

An embodiment of the present invention may efficiently provide and make available associated documentation and other supporting data. For example, change-sets between product and/or plugin(s) may be automatically generated for release notes, firmwide communication notices, and PTX reviews. Individual plugin information pages may be created to increase the overall documentation maturity. An embodiment of the present invention may automate the infrastructure documentation with existing plugin's version and state.

An embodiment of the present invention may be directed to minimizing and/or managing an entity's Technical Debt. For example, an embodiment of the present invention may perform analysis against API changes from a product's current version to its targeted version. A list or table of API calls may be provided demonstrating a function change, a remedy, and/or its use within a set of hooks, listeners, etc. For example, an embodiment of the present invention may provide a table of hooks and/or listeners with each modification required to accommodate the new API changes.

An embodiment of the present invention may be directed to plugin modernization. For example, the innovative tool may run against a current set of supported plugins for an existing base product version. Any necessary plugin upgrades may be gathered (along with their changes) and release notes may be prepared. In addition, monthly (or other periodic time frame) plugin releases may serve to keep the base product current and performant.

An embodiment of the present invention may be directed generating or providing a Plugin Risk Rating. For example, a targeted plugin version may carry a risk rating depending upon the amount of versions between the current version and the targeted version. This may include: within the same major version=Low (Example: Current 1.0=>1.9); one major version difference=Medium (Example: Current 1.0=>2.9); larger than one major version difference=High (Example: Current 1.0=>3.9). Other ranges and scales (in varying granularity) may be applied.

An embodiment of the present invention may be directed to Risk Reduction. This may involve automatically uploading a product and required plugin binaries to comprehensive software composition analysis solution (e.g., Blackduck, etc.) for vulnerability scans. Other solutions for managing risks may be applied to provide risk management and binary inspection.

An embodiment of the present invention may provide insights relating to upgrades to various versions by considering an entity's technical debt. An entity may select a preferred version based on a corresponding determination of technical debt, risk as well as other considerations. By understanding technical debt associated with various versions, an entity may select a corresponding version that is best suited.

An embodiment of the present invention may be extended to the other platforms, beyond Atlassian, including JIRA and Confluence. An embodiment of the present invention may be programmatically modified to support various internal or external software platforms where version information and other requirements may be obtained via a REST or via the vendor's documentation URLs.

FIG. 1 is an exemplary flowchart for implementing technical debt automation, according to an embodiment of the present invention. As shown in FIG. 1, implementation steps 104 may be executed between a product 102 and a third party entity 106. At step 110, technical debt automation (TDA) may be initiated. At step 112, settings may be loaded. At step 114, information relating to versions, products and plugins may be obtained. This information may be obtained from Product Version 116 and Installed Plugins and Versions 118. At step 120, reference documentation may be obtained. At step 126, products, plugins and binaries may be obtained. This information may be obtained from a third party, represented by 122 and 124. At step 128, binaries may be uploaded for scanning, via 130. At step 132, technical debt may be determined, via 134. At step 136, technical debt remediation may be generated. At step 138, plugin upgrade paths may be generated. At step 140, documentation may be generated, via document management tool 142. At step 144, Agile components may be generated via an issue tracking system 146. The process may end at 148. While the process of FIG. 1 illustrates certain steps performed in a particular order, it should be understood that the embodiments of the present invention may be practiced by adding one or more steps to the processes, omitting steps within the processes and/or altering the order in which one or more steps are performed.

Technical Debt Automation of an embodiment of the present invention may run in a series of modes. This may include a research mode to maintain a set of current plugins and to create a full upgrade according to (Agile) standards.

Figure 2:
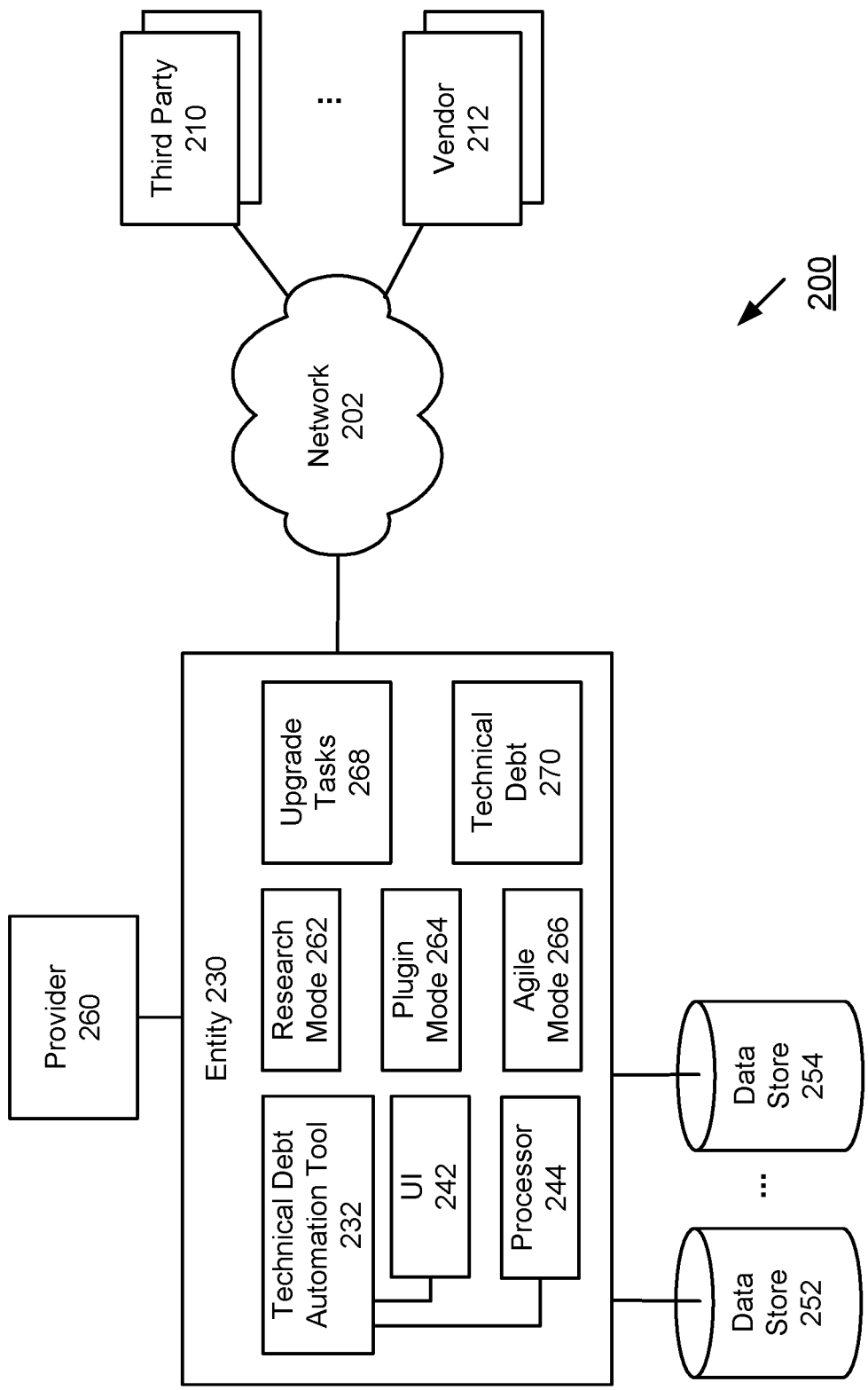
FIG. 2 is an exemplary system for implementing technical debt automation, according to an embodiment of the present invention.

FIG. 2 illustrates a schematic diagram of a system that implementing a Technical Debt Automation Tool, according to an exemplary embodiment. As illustrated in FIG. 2, Network 202 may be communicatively coupled to Third Parties, represented by 210, and Vendors represented by 212, via computing devices. Computing devices may include computers, laptops, workstations, kiosks, terminals, tablets, mobile devices, mobile phones, smart devices, etc. Network 202 communicates with Entity 230 that performs technical debt automation functions. Entity 230 may include a Technical Debt Automation Tool 232 that determines or calculates technical debt (e.g., customization changes associated with a target version change) that an entity (e.g., firm) will have to make due to customizations.

Technical Debt Automation Tool 232 may also incorporate modules and other functions, such as User Interface (UI) 242 and Processor 244. Other modules may include Research Mode 262, Plugin Mode 264, Agile Mode 266, Upgrade Tasks 268 and Technical Debt 270. These modules are exemplary and illustrative, Technical Debt Automation Tool 232 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Technical Debt Automation Tool 232 may perform in a series of modes. This may include a Research Mode to maintain a set of current plugins and to create a full upgrade according to Agile standards and/or other standards.

Research Mode 262 may maintain a record of product updates from a vendor. Technical debt, required plugin paths and release notes may be generated. Also, Confluence pages may be created for internal review.

Plugin Mode 264 may generate the required plugin upgrade paths. Release notes for targeted plugin versions may be documented. For example, Blackduck uploads for vulnerability scans may be initiated.

With Agile Mode 266, epics, stories and meeting invitations may be created. An Agile epic may represent a body of work broken down into specific tasks (called "stories," or "user stories") based on needs and/or requests of customers or end users. Epics may be considered a helpful way to organize work and create a hierarchy. For example, work may be broken down into shippable pieces, so that large projects may actually get done and users can continue to ship value to customers on a regular basis. Epics assist teams break work down, while continuing to work towards a bigger goal.

Technical Debt Automation Tool 232 may automate upgrade tasks and create necessary components into the backlog for spring review and subsequent timetable planning. Upgrade Tasks 268 may include Product Version, Product Upgrade Epic, Product Binary, Plugin Binaries, etc.

Technical Debt 270 may represent customizations written by an entity that may be required to be changed due to a targeted version change. Technical Debt 270 may include API Deprecations, Hook Deprecations and Dependencies.

Entity 230 may be communicatively coupled to data storage devices represented by Data stores 252, 254. Also, Data stores 252, 254 may also store and maintain source code, reports, performance data, etc. The technical debt automation features described herein may be provided by Entity 230 and/or a third party provider, represented by 260, where Provider 260 may operate with Entity 230.

The system 200 of FIG. 2 may be implemented in a variety of ways. Architecture within system 200 may be implemented as hardware components (e.g., module) within one or more network elements. It should also be appreciated that architecture within system 200 may be implemented in computer executable software (e.g., on a tangible, non-transitory computer-readable medium) located within one or more network elements. Module functionality of architecture within system 200 may be located on a single device or distributed across a plurality of devices including one or more centralized servers and one or more mobile units or end user devices. The architecture depicted in system 200 is meant to be exemplary and non-limiting. For example, while connections and relationships between the elements of system 200 is depicted, it should be appreciated that other connections and relationships are possible. The system 200 described below may be used to implement the various methods herein, by way of example. Various elements of the system 200 may be referenced in explaining the exemplary methods described herein.

Network 202 may be a wireless network, a wired network or any combination of wireless network and wired network. For example, Network 202 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, Network 402 may support an Internet network, a wireless communication network, a cellular network, Bluetooth, or the like, or any combination thereof. Network 202 may further include one, or any number of the exemplary types of networks mentioned above operating as a stand-alone network or in cooperation with each other. Network 202 may utilize one or more protocols of one or more network elements to which it is communicatively coupled. Network 202 may translate to or from other protocols to one or more protocols of network devices. Although Network 202 is depicted as one network for simplicity, it should be appreciated that according to one or more embodiments, Network 202 may comprise a plurality of interconnected networks, such as, for example, a service provider network, the Internet, a cellular network, corporate networks, or even home networks, or any of the types of networks mentioned above.

Data may be transmitted and received via Network 202 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 2 illustrates individual devices or components, it should be appreciated that there may be several of such devices to carry out the various exemplary embodiments. Entity 230 may communicate using any mobile or computing device, such as a laptop computer, a personal digital assistant, a smartphone, a smartwatch, smart glasses, other wearables or other computing devices capable of sending or receiving network signals. Computing devices may have an application installed that is associated with Entity 230.

Entity 230 may be communicatively coupled to Data Stores 252, 254 as well as remote storages. These storage components may include any suitable data structure to maintain the information and allow access and retrieval of the information. For example, the storage components may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

The storage may be local, remote, or a combination. The storage components may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). The storage components may have back-up capability built-in. Communications with the storage components may be over a network, such as Network 202, or communications may involve a direct connection between the various storage components and Entity 230, as depicted in FIG. 2. The storage components may also represent cloud or other network based storage.

The various embodiments of the present invention may apply to a wide range of applications, use cases and scenarios. For example, a global entity may manage large scale platforms for an entire development population. This could impact tens of thousands of users and employees. Accordingly, when updates are made to a platform, great effort and care are exercised so that such updates are performed correctly. Because the impact is so widespread, the update needs to be planned and executed without any issues. An exemplary illustration may involve a system that includes a strategic source control platform (e.g., Bitbucket), a firm-wide strategic wiki that manages documentation and other data (e.g., Confluence) and a defect tracking and requirement management system (e.g., Jira). This system may reach a population of 150,000 employees/users.

To perform this update (or upgrade), an embodiment of the present invention may analyze a current state of product versions and further identify the various dependencies (e.g., plugins, code, etc.) as well as proprietary and customized hooks, listeners, add-ons and workflows that were built to enhance and customize a product or platform. In addition, an entity may further build safeguards for cyber and/or risk controls. Other customizations may be identified.

An embodiment of the present invention may analyze a current version (including plug-ins, etc.), reach out to a vendor or other third party site (e.g., website, repository, etc.) and analyze available versions to determine an optimal upgrade path/map and to ensure compatibility. An embodiment of the present invention may further verify dependencies on third party software and/or other services. For example, if one portion of the system is upgraded, other portions of the system may or may not need updating as well. This may include updates to an entity's proprietary code.

An embodiment of the present invention may further determine an overall risk calculation. This may be determined from a development manager's standpoint. For example, an embodiment of the present invention may recognize that upgrading from version 1.0 to version 1.1 involves 2-3 plug-ins out of 30. This would represent a low risk. According to another example, upgrading from version 1.0 to 1.5 would involve 15-20 plug-ins to be modified, which would represent a higher overall risk.

An embodiment of the present invention may also consider the back-end API of a base version tool. Other back-end processing may be analyzed. For example, an embodiment of the present invention may analyze and consider API changes. This may involve going through functions and calls to confirm that parameters sets and return sets are consistent. An embodiment of the present invention may then build up a risk profile to identify how much effort (e.g., manpower, resources, time, etc.) would be expected to perform the update and how much risk would be involved.

An embodiment of the present invention may further generate a mapping (e.g., plan, roadmap, etc.) for a developer to execute. The mapping may identify a particular file or files that need to be updated and further which specific functions and parameters need to be changed in the code base. The mapping increases inefficiency by providing a clear path to perform the upgrade. For example, the mapping may indicate that out of 40 files, only four of those files need to be updated and from those files, a specific set of functions will be upgraded. This may be supported by Agile methodology.

The mapping may also serve as a training tool for a junior, less experienced developer. This would provide a more efficient use of manpower and resources. Such upgrades would no longer require senior developers with over 10 years of experience in a particular technology area.

Moreover, an embodiment of the present invention may further catalog mapping information in a defect tracking tool (e.g., stories, epics, requirements, requests, tasks, etc.). This may involve identifying and downloading the actual binaries, code and other plug-ins that are needed. For example, an upgrade may involve 30 different plug-ins that need to be updated. The plug-ins may be pulled, downloaded and moved into a workflow in a risk vulnerability system. In addition, underlying documentation, release notes and other data may be accessed and downloaded. For example, an embodiment of the present invention may use the URL of a vendor and extract corresponding documentation, code and/or other associated data/information.

An embodiment of the present invention may further perform what-if scenarios. For example, a vendor may indicate that a version used by an entity will no longer be supported by the end of the year. An embodiment of the present invention may provide a forward-looking approach that compares different versions for the update. This may include analyzing expected time and effort involved and a risk profile. For example, the entity may need to decide which out of several versions would be an optimal version to upgrade to. In this example, an embodiment of the present invention may recognize that upgrading to version 1.2 and 1.4 would require the same amount of time with the same amount of risk. In this example, upgrading directly to version 1.4 would be an optimal path forward. Other factors and considerations may be analyzed.

According to another example, a vendor may notify an entity that a critical vulnerability has been detected in a particular software. In this example, a software patch would need to be created as soon as possible to address this known vulnerability. An embodiment of the present invention may determine that this upgrade involves a set of plug-in and a set number of APIs, with an estimate completion time of one week with a team of 2-3 developers. An embodiment of the present invention may provide an even quicker completion time of 3 days with a team of 5 developers.

An embodiment of the present invention may identify and manage supporting information, such as documentation and release notes and further communicate this information to end users. Other functions may include scheduling meetings, making distributions, communicating stories, epics, requirements, requests, tasks as well as an entire roadmap and further publishing this information to management.

An embodiment of the present invention may be directed to generating and applying a risk profile. The risk profile may be realized in various ways. For example, the risk profile may correspond to a number or quality of differences between a base version and a target version. For example, an upgrade from version 2.0 to 2.1 will likely require a small number of changes whereas an upgrade from version 2.0 to 3.5 would involve more substantial differences. Another consideration for risk management may involve risk mitigation. This may involve identifying a number of changes (e.g., in terms of functions, modules, APIs, plug-ins, etc.) in an entity's proprietary code. This may correspond to an amount of effort needed to realize the upgrade/update.

Figure 3:
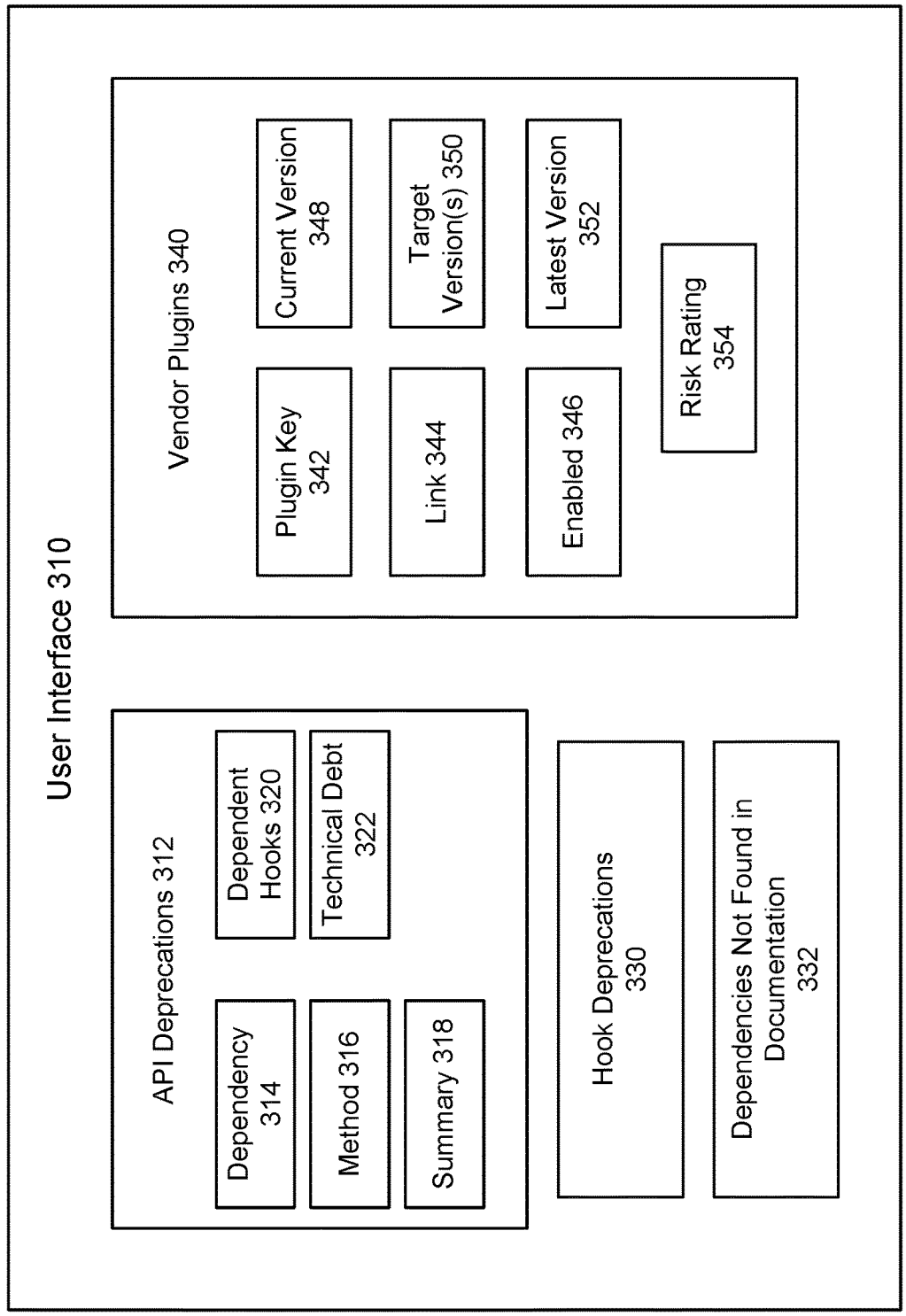
FIG. 3 is an exemplary user interface, according to an embodiment of the present invention.

FIG. 3 is an exemplary user interface, according to an embodiment of the present invention. An exemplary user interface may identify internal services/modules that must be modified, denoting the specific method, a summary of the item, and items that are dependent upon this service or module. The user interface may further outline method depreciations which may need to be modified. It may further highlight dependencies that are no longer found in a vendor's API.

In addition, user interface may denote the needed third party plugins that must be upgraded along with an internal risk rating. It further notes items that are no longer in the marketplace and are no longer offered.

As shown in FIG. 3, User Interface 310 may include information concerning API Deprecations 312, Hook Deprecations 330 and Dependencies not found in documentation 332. API Deprecations 312 may include data relating to Dependency 314, Method 316, Summary 318, Dependent Hooks 320, and Technical Debt 322. Dependency 314 may identify dependent applications, services, etc. Method 316 may identify a corresponding function, e.g., getHomeDir( ) unauthenticate( ) validate, etc. Summary 318 may provide status and other information, such as this method is deprecated, use another method instead, etc. Dependent Hooks 320 may identify specific functions, such as EntityForceCodeReview, KeyHook, etc. Technical Debt 322 may indicate whether a debt has been accumulated. Hook Deprecations 330 may identify a hook and possible deprecations. For example, a Hook may include "BlockAllCommits" and possible deprecations may include "watch (Repository repository, String commitId)," for example. Dependencies not found in documentation 332 may provide a list of dependencies without corresponding data.

Vendor Plugins 340 may include data relating to Plugin Key 342, Link 344, Enabled 346, Current Version 348, Target Version(s) 350, Latest Version 352 and Risk Rating 354. Plugin Key 342 may identify plugin information. Keys that could not be found may also be identified. Link 344 may identify links to supporting documents and information from a third party website or other resource. Enabled 346 may indicate whether the plugin is enabled or not. Current Version 348 may identify version information. Target Version(s) 350 may identify available versions, this may include a version or a range of versions. Latest Version 352 may identify a latest compatible version. Risk Rating 354 may identify a level of risk, e.g., low, medium, high.

For Risk Rating, the targeted plugin version may carry a risk rating depending upon the amount of versions between the current version and the targeted version. For example, within the same major version, a low risk may be attributed (e.g., Current 1.0=>1.9). For one major version difference, a medium risk may be assigned (e.g., Current 1.0=>2.9). For larger than one major version difference, a high risk may be assigned (e.g., Current 1.0=>3.9). Other scales and variations may be applied.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a technical debt automation tool, the system comprising:
a memory configured to store and manage source code; and
a computer processor, coupled to the memory, configured to perform the steps of:
identifying a product that is installed where the product is associated with a vendor;
obtaining a set of dependencies comprising version data and plugin data representing a customization of the installed product;
obtaining, via an external link, reference documentation from a source associated with the vendor;
obtaining, via the external link, product and plugin binaries from the source associated with the vendor;
uploading binaries for scanning to a security vulnerability platform;
determining a technical debt associated with an update from a current version of the installed product to an upgrade version wherein determining the technical debt comprises:
analyzing one or more application programming interface ("API") changes from the current version of the installed product to the upgrade version, the analysis providing a table of hooks and listeners with each modification required to accommodate the one or more API changes;
calculating an overall risk based on a number of software revisions between the current version of the installed product and the upgrade version and a number of plugins involved with the update based on the number of software revisions; and a set of changes and mapping for the update;

generating technical debt remediation based on the determined technical debt;

generating a set of plugin upgrade paths for the update; and communicating, via a communication network, the technical debt and the set of plugin upgrade paths to a recipient.

2. The system of claim 1, wherein the technical debt automation tool executes in a plurality of modes comprising: research mode, plugin mode and agile mode.

3. The system of claim 1, wherein the set of dependencies further comprises one or more of: proprietary and customized hooks, listeners, add-ons and workflows.

4. The system of claim 1, wherein the technical debt and the set of plugin upgrade paths are provided via an interactive user interface.

5. The system of claim 4, wherein the user interface provides API deprecations, hook deprecations and dependencies not found.

6. The system of claim 4, wherein the user interface provides vendor plugins comprising plugin key, current version, target version, latest version and risk rating.

7. A method that implements a technical debt automation tool, the method comprising the steps of:

identifying a product that is installed where the product is associated with a vendor;

obtaining a set of dependencies comprising version data and plugin data representing a customization of the installed product;

obtaining, via an external link, reference documentation from a source associated with the vendor;

obtaining, via the external link, product and plugin binaries from the source associated with the vendor;

uploading binaries for scanning to a security vulnerability platform;

determining a technical debt associated with an update from a current version of the installed product to an upgrade version wherein determining the technical debt comprises:

analyzing one or more application programming interface ("API") changes from the current version of the installed product to the upgrade version, the analysis providing a table of hooks and listeners with each modification required to accommodate the one or more API changes;

calculating an overall risk based on a number of software revisions between the current version of the installed product and the upgrade version and a number of plugins involved with the update based on the number of software revisions; and a set of changes and mapping for the update;

generating technical debt remediation based on the determined technical debt;

generating a set of plugin upgrade paths for the update; and communicating, via a communication network, the technical debt and the set of plugin upgrade paths to a recipient.

8. The method of claim 7, wherein the technical debt automation tool executes in a plurality of modes comprising: research mode, plugin mode and agile mode.

9. The method of claim 7, wherein the set of dependencies further comprises one or more of: proprietary and customized hooks, listeners, add-ons and workflows.

10. The method of claim 7, wherein the technical debt and the set of plugin upgrade paths is provided via an interactive user interface.

11. The method of claim 10, wherein the user interface provides API deprecations, hook deprecations and dependencies not found.

12. The method of claim 10, wherein the user interface provides vendor plugins comprising plugin key, current version, target version, latest version and risk rating.

* * * * *